2,892,802

MEDIUM FOR EMULSION POLYMERIZATION OF ETHYLENICALLY UNSATURATED MONOMERS AND METHOD THEREFOR AND COMPOSITION THEREFROM

Eugene Paul Budewitz, Homewood, Ill., assignor to The Sherwin-Williams Company, Cleveland, Ohio, a corporation of Ohio No Drawing. Application January 30, 1956
Serial No. 562,001

26 Claims. (Cl. 260—17)

This invention relates to a universal aqueous medium in which ethylenically unsaturated polymerizable organic compounds may be emulsified and polymerized to form relatively high molecular weight dispersions of polymers-in-water useful in film-forming protective and decorative coatings.

More particularly, this invention relates to an improvement in the combination of ingredients co-acting in aqueous menstruum to provide a favorable environment for free radical polymerization of one or more ethylenically unsaturated polymerizable monomers. The synergistic combination comprises a dilute solution of a non-ionic protective colloid, a water soluble non-ionic emulsifying agent containing a plurality of oxyethylene groups wherein the effective balance between lipophilic and hydrophilic ends of the molecule characterizes the surfactant as having a hyrdrophilic number or HN value in excess of 65 but not more than about 75 and a quantity but not in excess of about 1% by weight of one or more acetylenic, ditertiary dihydric alcohols.

The principal object of this invention is to provide an aqueous menstruum in which emulsion polymerization reactions may be carried on to form homopolymers, copolymers, terpolymers and other interpolymers of ethylenically unsaturated monomers without excessive foaming, in a predetermined range of particle size useful to deposit of themselves, or after plasticizing, continuous solid films for protective and decorative coatings use.

It is an attendant object to provide a method for producing emulsion polymers of the oil-in-water class which are of improved stability as to age, as to dilution capacity, and freeze-thaw cycling in liquid dispersed form and of improved durability against re-emulsification when in a deposited, dry-film form.

In general practice of the invention a stock solution of a non-ionic protective colloid, and preferably a fully hydrolyzed polyvinyl alcohol (of from 1 to 10% concentration) is prepared by dissolving the protective colloid in water at 150 to 195° F.

A jacketed resin kettle equipped with a reflux condenser, thermometer, sealed variable-speed motor drive agitator, inert gas inlet, monomer inlet and an additional inlet for metering in of catalyst in fluid form provides suitable apparatus for conducting the polymerization reactions of interest.

If monomers gaseous at room temperature are contemplated, means for pressurizing the system are essential. It is preferred to use a pump to circulate hot water through the exterior jacket of the resin kettle and to provide means to switch to cold water quickly, should the reaction "take off" exothermally.

The stock aqueous solution of protective colloid is charged to the kettle along with the acetylenic alcohol and non-ionic polyoxyethylene containing surfactant and the interior of the kettle purged with nitrogen. Further, it is preferred to maintain a nitrogen blanket over the reactants throughout the reaction period. Solution of the protective colloid can be accomplished at this point if one so elects. The temperature of the colloid-water dispersion is raised to 150–175° F. in one procedure before any monomer addition is made.

The method of addition of the monomer or blend of monomers controls the particle size range of the final polymerized disperse particles to a great extent. It is preferred to seed the reaction with a small quantity of previously prepared emulsion of the same quality and particle size before introducing the monomer.

First, assume the desire is to produce a fine particle size product. After seeding the aqueous reaction medium at 150–175° F., a small amount of sodium bicarbonate is added and a part (⅓ in the case of a vinyl acetate homopolymer) of the peroxide free-radical polymerization catalyst is added. Thereafter the monomer is fed into the aqueous reaction medium at a rate sufficient to maintain a slight or gentle reflux or monomer. If reflux continues for more than a few minutes after monomer addition is stopped, additional increments of a free radical catalyst are added (10% of total has been used with good results) to reactivate. In the case of vinyl acetate homopolymerization, for example, the temperature will not exceed about 185° F., nor fall below about 165° F. After all of the monomer has been added, the temperature is increased and refluxing substantially stops. Additional time at slightly above reaction temperature subsequent to this period is beneficial. Rapid cooling of the emulsion polymer should be avoided.

If a relatively coarse particle size emulsion is desired, the result may be obtained by adding the entire quantity of monomer to start. The catalyst is held back, using approximately ⅓ of the total catalyst with the monomer charge. The temperature of the aqueous reaction medium at the start is preferably below 150° F. and raised slowly after monomer addition to a moderate reflux rate. The resultant exothermic reaction which ensues is controlled by running cooling water through the vessel jacket and by careful control (slowing down) of the rate of catalyst addition. Start of vigorous reflux serves as a signal to curtail the reaction rate in the vessel by cooling. After all catalyst has been added and the reflux rate again slows to a practical stop, the temperature of the reaction mass is allowed to increase below the boiling point of water and preferably not above about 190° F. for a half hour, more or less. Practice is to filter the batch to remove any coagulum and to vacuum distill the product before it cools down to remove the last traces of monomer. Residual monomer to the extent of ½% and more in the final emulsion polymer has been found to contribute to product instability.

An improved technique of large particle size production utilizes a variation over that set forth above. Advantage resides in better thermal control during production. In this process the jacketed vessel is seeded with a large particle size, pre-formed emulsion. The protective colloid, water, about one-third of the total catalyst and ditertiary acetylenic alcohol is combined with the pre-formed emulsion polymer. Approximately one-third of the total non-ionic surfactant and the monomer or blend of monomers is added and emulsified into the so prepared aqueous medium at 150–160° F. When reflux slows down after holding at about 185° F. another ⅓ of the surfactant and another ⅓ of monomer is added along with a proportionate amount of catalyst. The time-temperature reflux conditions of the first step are repeated. Again, after reflux becomes impractically slow, the final one-third of emulsifier, monomer and catalyst are added to the reaction mass and the same conditions repeated a third time. It has been determined by the work herein described that the ratio of monomer to fresh surfactant is important in control of particle size. Generally, the larger amount of monomer to smaller amount of surfactant during the first few minutes of polymerization leads to larger particle size products, the reverse also holding true, namely; small amount of monomer to large amount of surfactant leads to fine particle size products. Control of particle size of the disperse oil phase appears, from data presently available, to be of particular advantage in coating compositions.

A secondary procedure provides an alternative method. In this process the aqueous phase is seeded. About 10% of the total monomer charge is added to the aqueous reaction medium (at about 160° F.) plus about ⅓ of the total catalyst. The reaction medium is allowed to reflux slowly until the reflux rate approaches zero. At that time further increment additions of monomer and catalyst are carried out, maintaining the slow reflux rate. These steps are repeated until all monomer is reacted and reflux ceases.

A third and preferred procedure, giving rise to products of intermediate particle size of dispersed polymer phase has been found most adaptable to large scale production. Further, it has the advantage of (1) freeze-thaw cycle quality of the larger particle size emulsions, (2) adhesion of larger size particles, (3) water resistance of the dry film of small particle size emulsions, (4) dilution and shelf stability of the fine particle size products. This third procedure is described and illustrated with specific relation to vinyl acetate homopolymers in Example 3 which follows. The same procedure is both applicable to and advantageously used in producing copolymers, terpolymers and higher interpolymers by obvious modification in monomer content.

Having thus described the invention generally, the following examples are included as illustrative of various homopolymers, copolymers, and terpolymers in the formation of which the aqueous reaction medium here described has been advantageously employed in the manufacture of emulsion coating compositions.

EXAMPLE 1

*Vinyl acetate homopolymer (small particle size)*

Into a two liter resin kettle equipped with a reflux condenser, thermometer, sealed variable-speed motor driven stirrer, nitrogen blanket tube and dual separatory flasks were weighed 875 grams of a 4% aqueous solution of a 98% hydrolyzed quality polyvinyl alcohol of two viscosity grades (50% Elvanol 72–60 and 50% Elvanol 70–05), 0.5 gram dimethyl octynediol, 17 grams gum arabic and 17 grams of a polyethylene glycol alkyl ether having an HN number of about 74 (Tergitol Dispersant XC Carbide and Carbon Chemicals generally identified as a polyalkylene oxide ether and specifically believed to be a polyethylene oxide ether and now identified by the manufacturer as an alkyl mixed ether of polypropoxy polyethoxy ethanol of a molecular weight of approximately 3000). The reaction vessel was purged with nitrogen and the reaction medium heated to 150° F. to assist solution of added protective colloid. At 175° F. an addition was made of 2 grams sodium bicarbonate and 2 ccs. of 29% hydrogen peroxide. 672 parts of freshly distilled vinyl acetate monomer were weighed into the separatory flask. The cock was opened sufficiently to allow slow addition of the monomer, and monomer and catalyst addition were regulated so that gentle reflux persisted and the temperature did not exceed 180° F. nor fall below 165° F. Reflux should stop within a few minutes after monomer addition is cut off. If this does not occur, additional free radical polymerization catalyst (hydrogen peroxide) is added in 1 cc. increments. 6 ccs. of peroxide is usually sufficient for the entire reaction. When all the vinyl acetate monomer has been added, refluxing subsides and the batch temperature increased to about 190° F. The batch is held at this temperature for 30 minutes, more or less. Thereafter, the heat input is discontinued and the batch cooled slowly. Agitation is continued throughout the heating and cooling period at a relatively slow rate.

The emulsion polymer product has a pH of between 3.5 and 6, will not settle in 24 hours though diluted 900% with distilled water, will not coagulate after 3 cycles of freezing at −10° F. and thawing at room temperature.

Pre-seeding the reaction medium with a similar product, previously made, is suggested to obtain optimum product quality.

EXAMPLE 2

*Vinyl acetate homopolymer (large particle size)*

Equipment and formulae are the same as in Example 1 except 12 grams of the non-ionic emulsifier were used. In this process, after addition of 2 ccs. of catalyst to initiate the reaction, all of the vinyl acetate monomer is added to the aqueous reaction medium at one time.

Due care should be exercised in supplying heat to the reaction mass. Monomer reflux starts at about 150° F. whereupon the reaction proceeds exothermically at such rate that cooling water must often be fed through the outer jacket to prevent too violent a reaction. Additional catalyst is added in small increments after the refluxing slows until 6 ccs. total have been added.

When the reaction has been completed the temperature is held at 190° F. for 30 minutes and the final emulsion product subjected to vacuum treatment, while still hot, to remove traces of monomer. Not only do residual amounts of monomer contribute to odor, but in quantities over ½% excess monomer contributes to emulsion instability. The dispersed particle size of the resulting emulsion homopolymer range from 5 to 30 microns in diameter.

It is general practice to increase the non-ionic polyoxyethylene containing emulsifier content slightly when making fine particle size products (eg. 1.5% on the water present is useful) and to reduce the emulsifier content, for example, to about 0.6%, when producing large particle size products.

EXAMPLE 3

*Vinyl acetate homopolymer.—Preferred method intermediate particle size*

In this procedure, the aqueous solution of the non-ionic protective colloids is prepared and the polyvinyl acetate monomer is emulsified therein by means of the water soluble non-ionic ethylene oxide addition product surfactant. The emulsified monomer is transferred to the separatory funnel leading to the reaction vessel. The reaction vessel is charged with a quantity of a previously prepared emulsion homopolymer of about ⅕ the total weight of the batch to be made. Temperature of the seed charge is elevated to about 150° F. The alkali bicarbonate and 2 ccs. of hydrogen peroxide, free radical polymerization catalyst, are added to the seed charge to promote polymerization. 10% of the total of emulsified monomer in the separatory funnel is added to the emulsified polymer seed charge in the reaction vessel. The temperature is raised to provide a gentle reflux rate. Use of the seed charge is not essential, but provides a useful technique. Reflux rate is maintained until the temperature reaches 175° F. and reflux stops. Again an addition of 10% of the total emulsified monomer is added, slowly, along with sufficient catalyst to maintain reflux conditions. Slow, stepwise addition is carried forward until all catalyst (about 6 ccs. in this case) and emulsified monomer have been carried into the reaction medium.

After the last aliquot portion of emulsified monomer and free radical catalyst have been added and reflux substantially ceases, the temperature is increased to 185-195° F. and held for 30 minutes. Final traces of monomer are removed and the product concentrated to about 45% monomer solids under vacuum while the batch is hot.

The particle size of the product is intermediate between that obtained in prior examples. The spread between large and small particles may range between 0.5 micron and 20 to 30 microns.

Advantages of both methods and particle size ranges are obtained. Freeze-thaw stability and adhesion of large particle size emulsions along with water resistance, dilution stability and shelf stability of the fine particle size process is obtained.

The above technique is equally applicable to the manufacture of copolymers, terpolymers and other interpolymers of ethylenically unsaturated monomers in producing oil-in-water emulsion polymers for use in the coatings art.

EXAMPLE 4

*Copolymer production.—Vinyl acetate-dibutyl maleate*

Process equipment as described in Example 1 was pressed into service for copolymerization reactions. An aqueous solution was prepared containing 70 grams of a high molecular weight fully hydrolyzed polyvinyl alcohol, 17 grams of gum arabic, 17 grams of an ethylene oxide addition product emulsifier having an HN value of 74 (Tergitol XC), 0.5 gram dimethyl octynediol, 2 grams potassium bicarbonate in 905 grams water. In general, the method of Example 1 was followed. A monomer blend containg 572 grams of vinyl acetate and 100 grams of dibutyl maleate was prepared and transferred to the separatory funnel. 2 grams of potassium persulfate in 4 grams water was added to the charge, meanwhile the reaction vessel was purged with nitrogen. The reaction mass was heated to 150° F. The stop-cock was opened sufficiently to allow slow addition of the monomer blend. 1 cc. additions of 10% aqueous solution of the alkali persulfate were made if reflux continued long after monomer addition was curtailed. The procedure was followed until all the monomer blend and an equivalent of about 5 grams total of potassium persulfate had been added. After the last addition of catalyst and monomer and arrest of reflux, the temperature was increased to about 190° F. The batch was held at this temperature for about 30 minutes. Traces of monomer were vacuum stripped from the copolymer emulsion and the concentration of polymer solids in the emulsion increased to about 45% by water evaporation.

This product, along with other copolymers identified in the following table, were formulated into emulsion paints for exterior exposure tests as well as other routine tests to determine comparative quality of the copolymerized film-forming components for a number of specific end uses, including fabric and paper coatings, primer for fresh plaster, interior wall finishes and industrial finishing applications.

Table I sets forth a series of copolymers produced in a similar manner to the emulsion copolymer described in Example 4 (with minor variations in free radical polymerization catalyst, non-ionic emulsifying agent containing a plurality of oxyethylene groups between an HN value of 65 and 75 and in the symmetrical acetylenic ditertiary alcohol selected). Variations were made within limitations hereinafter described in greater detail. The examples, while numerous, are not exhaustive of the potential combinations of ethylenically unsaturated monomers useful in accordance with this invention.

TABLE I

| Example Number | Principal Monomer | Minor Monomer | Weight Ratio Principal-Minor Monomer |
|---|---|---|---|
| 5 | Vinyl Acetate | Dibutyl fumarate | 90:10 |
| 6 | do | Dibutyl itaconate | 85:15 |
| 7 | do | Dibutyl maleate | 85:15 |
| 8 | do | do | 85:15 |
| 9 | do | Vinyl 2-ethylhexoate | 85:15 |
| 10 | do | Vinyl Propionate | 75:25 |
| 11 | do | 2-ethylhexyl acrylate | 90:10 |
| 12 | do | n-vinyl pyrrolidone | 85:15 |
| 13 | do | Vinyl stearate | 85:15 |
| 14 | do | Diisooctyl fumarate | 85:15 |
| 15 | do | Diisooctyl maleate | 85:15 |
| 16 | do | Dioctyl maleate | 85:15 |
| 17 | do | Dioctyl fumarate | 85:15 |

*Terpolymer production*

Again, in equipment as used and described in Example 1, a comprehensive series of terpolymers were produced as identified in Table II. The methods described in Examples 1, 2 and 3 were tried with favorable result obtained following the general procedure of Examples 3 and 4, namely; by pre-emulsification of the monomer blends in the aqueous reaction medium prior to polymerization by means of the free radical catalyst and catalyst activator in the reaction vessel. Here, the specific end use indicated desire for fine particle emulsion terpolymers.

While it is possibly unnecessary to describe a representative procedure in view of the examples of homopolymerization and copolymerization heretofore set out, some improvement has been observed in the quality of emulsion terpolymers obtained by a minor change in the non-ionic protective colloid used in the reaction medium combination. While satisfactory products are obtained without changing the colloid, in this instance one may substitute all or a part of the polyvinyl alcohol with a water soluble hydroxyethyl cellulose. This cannot be done in the homopolymer and copolymer with correlative improvement. In fact, only with correlative loss in quality. It is to be noted that in the case of the terpolymer condensations all of the polyvinyl alcohol may be replaced with hydroxyethyl cellulose without loss in quality of the final oil-in-water emulsion polymer system.

EXAMPLE 18

Into equipment as described in Example 4 were weighed 840 parts water, 17.5 parts of hydroxyethyl cellulose (of a quality which at 5% concentration in water yields a solution of 50-150 cps. at 20° C.) and 17.5 parts of hydroxy ethyl cellulose (of a quality which under the same conditions yields a solution of about 30-thousand cps.), 0.5 part dimethylhexyne diol, 17 parts of an alkyl aryl polyethylene glycol ether (Tergitol NPX, identified as an alkyl phenyl polyethylene glycol ether) having an HN value between 65 and 75 and 2 parts of potassium bicarbonate. The aqueous mixture was solubilized at a temperature of about 150° F. A blend of monomers consisting of 538 parts vinyl acetate, 67 parts dibutyl maleate and 67 parts ethyl acrylate was transferred to the separatory funnel and the reaction vessel purged with nitrogen. 2 parts potassium persulfate in 4 parts water were added to the aqueous reaction medium. The monomer blend was then fed into the aqueous reaction medium at a rate sufficient to maintain a steady drop-wise reflux return of disperse phase reactant to the aqueous reaction medium. The temperature was held at a level below 185° F., during monomer addition. Drop-wise additions of a 10% aqueous solution of potassium persulfate were made during the reaction period. (If reflux stopped upon arresting monomer addition, a drop or two of catalyst was added.) A total of 3.2 parts of catalyst were added to complete emulsion interpolymerization of the monomers. After all of the monomer has been added, the temperature was held at 185–190° F. for 30 minutes. Vacuum was drawn over the reaction mass and residual monomer removed.

In this instance the particle size of the final emulsion product was so fine that there was exhibited a reddish purple fluorescence characteristic of particles in colloidal states of subdivision. Fuorescence from blue-green to violet has been observed in other examples.

Terpolymer-containing emulsion polymer systems can be made in the various larger particle size ranges, as previously described for homopolymers and copolymers, by variations in technique as has been described herein. Fully hydrolyzed polyvinyl alcohol is equivalent to the hydroxyethyl cellulose in terpolymer formation reactions.

The following Table II illustrates a few of the many interpolymer systems that have been made in accordance with techniques referred to herein and illustrated in the examples.

TABLE II

| Ex. No. | Principal Monomer P | Minor Monomer B | Minor Monomer C | Weight Ratio, P:B:C |
|---|---|---|---|---|
| 19 | Vinyl Acetate. | Dibutyl Maleate. | Ethyl Acrylate | 90:5:5 |
| 20 | ----do---- | ----do---- | ----do---- | 70:15:15 |
| 21 | ----do---- | ----do---- | ----do---- | 50:25:25 |
| 22 | ----do---- | ----do---- | ----do---- | 50:40:10 |
| 23 | ----do---- | Acrylonitrile | Dibutyl Maleate | 80:10:10 |
| 24 | ----do---- | ----do---- | 2-ethyl hexyl acrylate. | 80:10:10 |
| 25 | ----do---- | Dibutyl Maleate. | N-butyl acrylate | 80:10:10 |
| 26 | ----do---- | 2-ethyl hexyl acrylate. | Dibutyl Maleate | 80:10:10 |
| 27 | ----do---- | Styrene | Ethyl Acrylate | 80:10:10 |
| 28 | ----do---- | Acrylonitrile | ----do---- | 80:10:10 |
| 29 | ----do---- | 2-ethyl hexyl maleate. | Ethylene glycol dimethacrylate. | 85:14:1 |

From the above examples it is obvious that combinations containing more than three different monomers offer opportunity for variation in quality of products obtained, affecting the adhesion, toughness, permeability, and other factors of moment in the paint industry. Investigations are under way with combinations of four different monomers in combination. It is contemplated that five different monomer studies will be explored as time permits.

Organic water insoluble monomers subject to addition polymerization containing an ethylenic double bond useful in accomplishing the end purpose of this invention, namely; an oil-in-water emulsion polymeric system useful in producing film-forming coatings, are innumerable. The following have been set out in the prior art, either as the sole agent in homopolymeric systems, or in dual combination to form copolymers, or in combinations of three or more to form increasingly complex high molecular weight condensation products. Representative species of the classes enumerated have been polymerized in the aqueous system herein described with consequent development of emulsion coating compositions suitable for a wide variety of architectural and industrial finishing end uses. Of primary significance are the polymerizable vinyl monomers including vinyl acetate, styrene, methyl styrene, divinyl benzene, vinyl hexoate, vinyl butyrate, vinyl valerate, vinyl sulfone, vinyl octoate, acrylonitrile, methyl acrylate, ethyl acrylate, butyl acrylate, 2 ethyl hexyl acrylate, tetrahydrofurfuryl methacrylate, vinyl toluene, etc., which are characterized by a terminal $CH_2=C-$ group. Other useful unsaturated monomers containing an ethylenic double bond are esters of alpha-beta unsaturated dicarboxylic acids and include methyl maleate, ethyl maleate, methyl fumarate, ethyl fumarate, diallyl maleate, methyl-aconitic acid esters, ethyl-aconitic acid esters, methyl and ethyl esters of citraconic and itaconic acid, dimethyl amyl maleate, ethylene glycol dimethacrylate and other unsaturated acid esters including those of saturated and unsaturated alcohols containing up to about 16 carbon atoms are known to be useful. In general, the longer the alkyl chain the slower the reactivity, but drying oils have been polymerized in emulsion systems wherein the alkyl chain contains 16 or more carbon atoms.

Still other useful monomers for emulsion polymerization include methyl isopropenyl ketone, methyl vinyl ketone, methacrylonitrile, piperylene, allyl acetate, butadiene, isoprene, methyl vinyl ether, etc. If pressure equipment is available even more volatile monomers for example; ethylene and substituted ethylenes, not liquids at usual emulsion polymerization temperatures but of the general class, are also of economic importance in the production of worth-while emulsion polymers.

Uses of the homopolymers, copolymers, terpolymers and tetra polymers, etc., producible in the emulsion systems of this invention are adaptable to many end purposes. The principal end use of moment here for products of this invention is in the protective and decorative coatings art, where the emulsion polymer may be used of itself as a clear coating for paper, cloth, wood, primed metal surfaces, etc. The emulsion polymers may be pigmented to produce requisite color and gloss, and they may be plasticized, either internally or externally, if desired, to modify the nature of the dry film deposited after evaporation of the aqueous phase.

Coatings containing a major percentage of polyvinyl acetate are presently widely used as coatings for fresh plaster, masonry, etc. They are useful as adhesives, as wood glue, as well as for laminating a variety of substances. Modification of a polymer containing a major percentage of vinyl acetate with one or more ethylenically unsaturated monomers other than vinyl acetate provides means for changing the nature of the final product to enhance various desired qualities including adhesion; resistance to water, organic chemicals, alkali and acid; toughness; solvency; hardness; etc. It is well known that the nature of the aqueous phase strongly influences the quality of product obtained in an emulsion polymer. From the foregoing it is clear that this invention provides improvement in the aqueous phase reaction medium in the emulsion polymerization art.

Because of the ready availability, lack of necessity of pressure reactors and economic advantages offered by vinyl acetate monomer, the greatest effort up to the present writing has been confined to products containing at least 50% of vinyl acetate monomer in the dispersed polymer forming phase. In the extensive exploratory work so far completed with various combinations and permutations of monomer quality and quantity there is nothing to indicate such limitation, arbitrarily imposed, is a limitation upon the diversity of emulsion polymers producible within the scope of this invention.

*Free radical catalysts*

Use of catalysts and the classes of catalysts useful in emulsion polymerization reactions involving ethylenically unsaturated monomers have been fairly thoroughly explored in the prior art and are those classed as free radical polymerization catalysts.

Among those commonly used are the peroxides, persulfates and azo type catalysts. The various water soluble persulfates include potassium and ammonium persulfate as exemplary. Illustrative peroxides include hydrogen peroxide, benzoyl peroxide, acetyl peroxide, tertiary butyl hydroperoxide and other organic peroxides having more or less solubility in water. Additionally, free radical catalyst activators are commonly employed in conjunction therewith and include sodium bicarbonate, water soluble pyrophosphates, water soluble iron and cobalt salts, etc.

The prior art indicates free radical catalysts are present and used in polymerization reactions in sufficient quantity to provide from 0.001 to about 0.1 part available oxygen per 100 parts of aqueous reaction medium during monomer interpolymerization.

The non-ionic emulsifier

In the prior art of emulsion polymerization of water-insoluble monomers containing ethylenic unsaturation, little attention has been given to emulsifier selection. In fact, the general picture presented is that all classes of emulsifiers including the anionic agents, illustrated by metal soaps of long chain or high molecular weight organic acids (sodium salts of alkyl aryl sulfonic acids); the cationic agents, illustrated by the quaternary nitrogen containing compounds (lauryl pyridinium chloride); and the non-ionic emulsifying agents, illustrated by the polyalkylene glycol esters of long chain fatty acids; are equivalent to each other and equivalently useful in polymerization reactions in emulsion systems. (Due attention paid, of course, in selection of emulsifier class to correlate with the alkaline or acid character of the aqueous phase in which the monomers are to be condensed.)

In studies leading to the present invention it was determined that not only is the general chemical class of emulsifying agent employed important but the stability with time of the polymer dispersions in water may be remarkably enhanced through correlating the surfactant essential to emulsion polymerization reactions with the nature of the protective colloid and the quality of other adjuvants present in the reaction medium.

In the present reaction medium for emulsion polymerization of ethylenically unsaturated monomers, the quality of the non-ionic emulsifying agents containing ethylene oxide groups chemically combined with oil soluble (oilophilic groups) groups were found to be a critical part of the total composition. The balance existing between the hydrophilic portion and the oilophilic or lipophilic portion of the non-ionic emulsifying agents was found critical within a relatively narrow range of value. A numerical value, referred to as the Hydrophilic Number or Hydrophile Number and more commonly and simply as the HN number, or HN value, or merely as HN, has been found extremely useful in reducing to an exact description the quality of balance of the hydrophilic and lipophilic portions of non-ionic agents essential to the aqueous emulsion medium herein described. Another terminology used in the emulsion art, referred to as the Hydrophile-Lipophile Balance, or HLB has numerical relation to HN. For practical purposes, they are related by the following simple equation:

$$HN = 5(HLB)$$

Thus, if the HLB of an emulsifier has been established as, for example, 14, then the HN value is approximately 70.

Originally, the HLB values were developed by purely empirical means and have been described in an article by Wm. C. Griffin entitled, "Calculation of HLB Values of Non-Ionic Surfactants" (December 1954, volume V, Number 4, Journal of the Society of Cosmetic Chemists). This paper was based in part upon earlier work of the same author in a paper entitled, "Classification of Surface Active Agents" appearing in volume I, Number 5 of the same Journal for December 1949. Both references are incorporated herein by reference.

Briefly stated, the HLB value is "an expression of the relative simultaneous attraction of an emulsifier for water and for oil (or for the two phases of a system to be emulsified) ... For purposes of convenience the effective balance of these two groups is assigned a numerical value." Under the HLB system of nomenclature those surfactants most lipophilic (or attracted to oil) are given low numbers and those attracted strongly to water are assigned progressively higher numbers. The numerical values range from one to forty with 10 being a practical mid-point of the range. Another group, concerned with non-ionic surfactants have adapted the term Hydrophilic Number, or HN to identify the hydrophile-lipophile balance of surfactants.

Further, experience with assignment of numerical physical constants to emulsifiers has established that these values are not limited to ethylene oxide containing surfactants, nor to any particular chemical class of emulsifiers but can be assigned to anionic surfactants as well. For example, the well-known sodium salt of dioctyl ester of sulfosuccinic acid (Aerosol "OT") has been demonstrated to have a very high hydrophilic number, or HN. Part of the higher values attributed to this class is believed due to their ionic nature. Indications are that the cationic agents are also of very high HN. One cationic agent, illustratively, possesses an HN value of more than 125.

The values referred to herein as HN numbers have a relatively specific relationship in the case of surfactants containing a plurality of oxyethylene units of the non-ionic type. In these surfactants the HLB or HN value is a function of the weight percentage of the hydrophilic portion of the molecule. In those instances where the hydrophobic group or lipophilic group is an alkyl phenol and the hydrophilic group contains a plurality of oxyethylene groups, the HN value is substantially equivalent to the weight percentage of ethylene oxide in the surfactant molecule.

More recently, another method of determining the HLB or HN value of non-ionic emulsifiers containing ethylene oxide groups has been suggested by Griffin which is based upon the temperature at which turbidity develops in a standard concentration of the non-ionic surfactant of unknown HLB or HN value in water. Turbidity does not always develop so that the method is not entirely universal.

Two non-ionic oxyethylene type surfactants of different but known HLB or HN value are dissolved in a standard quantity of water. Each is separately heated and the temperature of clouding or turbidity development noted. A cloud point temperature-HLB (or HN) graph is developed from the data. For practical purposes, the relationship illustrated by this technique is a straight line function. From an experimentally determined cloud point temperature of the unknown non-ionic emulsifier, an HLB or HN value may be assigned the surfactant of unknown value.

It is also understood in the art of emulsification that surfactants of varying HLB or HN may be blended in mathematical quantities to produce blends of emulsifiers of appropriate HLB or HN values intermediate the values of those selected for blending, having a requisite HN value in the combination. It is within the scope of this invention that this method be employed to produce, singly or by combination of two or more agents, surface active materials equivalent in HN value to those herein described and claimed.

Having described the general class of emulsifiers suitable for the purposes of this invention, several illustrative ones, preferred for use because they are readily available commercially and are outstandingly useful, are the polyoxethylated octyl and nonyl phenols and the alkyl polyglycol ethers having HN numbers of between 65 and 75. An additional series of compounds useful for the purposes of the invention have the general chemical structure of $(OH)(C_2H_4O)_a(C_3H_6O)_b(C_2H_4O)_cH$ wherein $a$, $b$, and $c$ are numerals of such value that the molecular weight of the base unit is between 1500 and 1800, the percentage of ethylene oxide groups in the molecule is between 20 and 50% and the HN value is estimated, from cloud point determinations, to be between 65 and 75.

From the above discussion it may be observed that the nature of the chemical combination and size of oilophilic and hydrophilic groups in non-ionic surfactants will affect the HN value. However, as the concept is a physical one, as previously explained, HN value provides a means of physical definition of the useful sub-classes under the non-ionic emulsifying agent class containing a plurality of oxyethylene groups suitable for the purposes of the present invention and illustrating for those skilled in the art substantial equivalents for the ends herein set out.

The amount of the non-ionic surface active agent may be varied between about .25% to not more than about 10% by weight of the water in the aqueous base reaction meduim. The amount of emulsifier present is known to influence the particle size of the resultant emulsion and obviously the amount of emulsifier will then be controlled in part by the particle size range of emulsion polymer particle desired in the ultimate product.

The protective colloid

Heretofore the emulsion polymerization art relating to monomer compounds containing an ethylenically unsaturated group has disclosed various hydrophilic protective colloids useful in the aqueous phase of emulsion polymerization systems. Among these are sodium carboxymethyl cellulose, water soluble methyl and ethyl celluloses, hydroxyethyl cellulose, partially hydrolyzed polyvinyl alcohol, gum arabic, gum tragacanth, water soluble alginates, casein and like substances. All are characterized by the fact that relatively small amounts when dispersed in water cause a disproportionate increase in the viscosity of water comparable with the quantity employed.

One most commonly suggested is polyvinyl alcohol containing up to about 10% of acetate groups. For the purposes of the present invention it has been found that excessive foaming is reduced, greater shelf stability upon age of the emulsion is obtained, higher reductions of the emulsion with water are permissible, increased mechanical stability (emulsion products will withstand very high shear for extended time periods), greater water resistance of the dried film, increased resistance to emulsion breakdown by freeze-thaw cycling, and lower emulsion viscosities are obtained in the herein recited aqueous phase composition if the protective colloid in the combination described is a polyvinyl alcohol containing at least 95% polyvinyl alcohol and preferably in excess of 98% polyvinyl alcohol or in other words substantially completely hydrolyzed polyvinyl alcohol. In the composition of the invention, more than 5% of polyvinyl acetate in the lyophilic colloid has been found to cause excessive foaming most difficult to control. In emulsion polymerizations of this invention, other protective colloids, such as hydroxyethyl cellulose and gum arabic, may be used to supplement the fully hydrolyzed polyvinyl alcohol in part. Not more than about 50% by weight of the protective colloid present may be substituted (except in the case of terpolymers) without diminishing the quality of the product. In the case of terpolymers substantially hydrolyzed polyvinyl alcohol and hydroxy ethylcellulose are equivalent. According to the best information at hand, the hydroxyethyl cellulose useful in the terpolymer systems contains from about 2 to 2½ ethoxy groups per cellobiose unit.

The total amount of protective colloid present may be varied within practical limits. At the low end of the scale—less than two percent (based on the weight of the total aqueous phase) poor adhesion is observable and at greater than 10%, viscosity of emulsion polymers containing from 40–55% emulsified polymer solids, is impractically high for coating purposes.

In specific homopolymers, copolymers and terpolymers some advantages can be obtained by more stringent attention to the quality and quantity of the protective colloid, as will be observed in certain of the previous examples included as illustrative. Synergistic effects between gum arabic and fully hydrolyzed polyvinyl alcohol, for example, have been observed in certain interpolymeric reactions.

Thus, for the broad purposes of this invention a fully hydrolyzed polyvinyl alcohol is essential as a major portion of the total protective colloid present in the aqueous reaction system herein described.

Specifically, and in the case of terpolymer systems, hydroxy ethyl cellulose is substantially equivalent to fully hydrolyzed polyvinyl alcohol and may be substituted for in whole or in part. This is not the case, however, with homopolymer and copolymer products.

The acetylenic alcohol

A further essential component of the combination found to produce emulsion polymers for coating purposes of improved quality are symmetrical, acetylenic ditertiary dihydric alcohols.

The function of the ditertiary acetylenic alcohols has not been established. Though the quantity useful is within a relatively narrow range, e.g. from trace amounts (on the order of 0.05%) to not more than 1% of the total aqueous phase, the beneficial influence on a wide variety of emulsion polymer systems and emulsion interpolymer reactions has been of outstanding value. Among the advantages noted by their inclusion have been increased stability upon subjecting the system to freeze-thaw cycling tests (so long as the aforementioned range is not exceeded) and lower viscosity of the emulsion system at a given solids polymer concentration.

Dimethyl hexynediol and dimethyl octynediol have been found to be extremely useful at about 0.1% to 0.5% by weight of the aqueous phase. Above 0.6% the advantages diminish and at more than 1% gelation has been observed in some instances after a single freeze-thaw cycle.

Other symmetrical acetylenic ditertiary alcohols containing several more or several less carbon atoms are also of interest as essentially equivalent to the specific ones above identified.

The following chart illustrates the advantage of the ditertiary acetylenic alcohols in a series of test runs wherein a straight polyvinyl acetate homopolymer of approximately 42% polyvinyl acetate solids was produced. Various quantities of dimethyl octynediol were added to the aqueous phase prior to polymerization.

TABLE III

| Experimental Number | Percent Tet. Acetylenic Alcohol | Visc. 20° C. SW #4 Cup | Freeze Thaw (3 Cycles) |
| --- | --- | --- | --- |
| 30 | 0 | 1'–40" | OK. |
| 31 | 0.06 | 39" | OK. |
| 32 | 0.60 | 22" | OK. |
| 33 | 1.20 | 28" | Gel. 1st Cycle. |
| 34 | 1.80 | 29" | Do. |

Having described the invention and illustrated it by example, I claim:

1. An aqueous phase reaction medium useful in conducting emulsion polymerizations of polymerizable ethylenically unsaturated monomers to produce polymer-in-water coating compositions which comprises from 1 to not more than 10% of a water soluble, non-ionic protective colloid, the essential component of which is a polyvinyl alcohol of at least 95% hydrolyzed quality, from 0.25% to not more than about 10% by weight of the water present of a water soluble non-ionic emulsifying agent containing a plurality of oxyethylene groups characterized by a HN value of in excess of 65 but not greater than 75 and a quantity but not more than about 1% by weight of said aqueous phase of a symmetrical, acetylenic ditertiary di-alcohol containing from 6–10 carbon atoms.

2. The method which comprises interpolymerizing in the form of an aqueous emulsion at least one ethylenically unsaturated monomer dispersed in an aqueous medium comprising a non-ionic protective colloid, the essential component of which is a polyvinyl alcohol of at least 95% hydrolyzed quality, a free radical polymerization catalyst, a free radical polymerization catalyst promotor, a water soluble non-ionic emulsifying agent containing a plurality of oxyethylene groups and characterized by a HN value of in excess of 65 but not greater than 75, and a quantity but not more than about 1% by weight of the aqueous phase of a symmetrical acetylenic ditertiary di-alcohol containing from 6–10 carbon atoms at an elevated temperature above 140° F. but not above 195° F. until monomer reflux substantially ceases.

3. The aqueous phase reaction medium of claim 1 wherein the acetylenic alcohol is dimethyl octyne diol.

4. The aqueous reaction medium of claim 1 wherein the acetylenic alcohol is dimethyl hexyne diol.

5. The aqueous reaction medium of claim 1 wherein the non-ionic emulsifying agent is an alkaryl polyoxyethylene alcohol.

6. The aqueous phase reaction medium of claim 1 wherein the non-ionic emulsifying agent is of the general chemical structure $(OH)(C_2H_4O)_a(C_3H_6O)_b(C_2H_4O)_cH$ where $a$, $b$, and $c$ are values such that the compound has a molecular weight between 1500 and 1800, and the percentage of ethylene oxide groups in the molecule lies between 20 and 50%.

7. The aqueous phase reaction medium of claim 1 wherein the non-ionic emulsifying agent is an alkyl polyglycol ether containing a plurality of oxyethylene groups.

8. The method of claim 2 wherein the symmetrical acetylenic alcohol is dimethyl octyne diol.

9. The method of claim 2 wherein the acetylenic alcohol is dimethyl hexyne diol.

10. An oil-in-water emulsion coating composition which comprises a homopolymer of vinyl acetate as the disperse oil phase and a continuous aqueous phase which comprises from 1 to 10% by weight thereof of a water soluble non-ionic protective colloid, the major proportion of which is a polyvinyl alcohol of at least 95% hydrolyzed quality; from about 0.25 to about 10% by weight of the aqueous phase of a water soluble non-ionic emulsifying agent containing a plurality of oxyethylene groups having an HN value in excess of 65 but not greater than 75; and a quantity but not more than 1% by weight of said aqueous phase of a symmetrical, acetylenic, ditertiary di-alcohol containing from 6–10 carbon atoms.

11. The product of claim 10 wherein the symmetrical ditertiary di-alcohol is dimethyl octyne diol.

12. The product of claim 10 wherein the symmetrical ditertiary di-alcohol is dimethyl hexyne diol.

13. The product of claim 10 wherein the non-ionic emulsifying agent is an alkyl polyglycol ether containing a plurality of oxyethylene groups.

14. The product of claim 10 wherein the non-ionic emulsifying agent is of the general chemical structure $(OH)(C_2H_4O)_a(C_3H_6O)_b(C_2H_4O)_cH$ where $a$, $b$, and $c$ are values such that the compound has a molecular weight between 1500 and 1800, and the percentage of ethylene oxide groups in the molecule lies between 20 and 50%.

15. The product of claim 10 wherein the non-ionic emulsifying agent is an alkaryl polyoxyethylene alcohol.

16. An oil-in-water emulsion which comprises a copolymer of a major proportion of vinyl acetate and a minor proportion of a second ethylenically unsaturated monomer polymerizable therewith, said copolymer constituting a disperse oil phase and a continuous aqueous phase, said continuous aqueous phase comprising from 1 to 10% by weight of said aqueous phase of a water soluble non-ionic protective colloid consisting essentially of a major proportion of a polyvinyl alcohol of at least 95% hydrolized quality; a quantity but not more than about 10% by weight of the aqueous phase of a water soluble, non-ionic emulsifying agent containing a plurality of oxyethylene groups having a HN value of an excess of 65 but not greater than 75; and a quantity but not more than 1% by weight of said aqueous phase of a symmetrical acetylenic, ditertiary di-alcohol is dimethyl octyne diol.

17. The product of claim 16 wherein the symmetrical acetylenic ditertiary di-alcohol is dimethyl hexyne diol.

18. The product of claim 16 wherein the symmetrical acetylenic ditertiary di-alcohol is dimethyl octyne diol.

19. An oil-in-water emulsion, the disperse phase of which comprises a terpolymer of a major proportion of vinyl acetate and a minor proportion of one each of two other ethylenically unsaturated monomers polymerizable therewith and a continuous aqueous phase, said continuous aqueous phase consisting essentially of from 1 to 10% by weight of said aqueous phase of a water soluble non-ionic protective colloid selected from the group consisting of polyvinyl alcohol of at least 95% hydrolyzed quality, hydroxyethyl cellulose and mixtures thereof; a quantity but not more than 10% by weight of the aqueous phase of a water soluble, non-ionic emulsifying agent containing a plurality of oxyethylene groups characterized by a HN value of 65 but not greater than about 75 and a quantity but not more than 1% by weight of said aqueous phase of a symmetrical, acetylenic, ditertiary di-alcohol containing from 6–10 carbon atoms.

20. The product of claim 19 wherein the non-ionic protective colloid is polyvinyl alcohol of at least 95% hydrolyzed quality.

21. The product of claim 19 wherein the non-ionic protective colloid is hydroxy ethyl cellulose.

22. The product of claim 19 wherein the symmetrical acetylenic ditertiary di-alcohol is dimethyl octyne diol.

23. The product of claim 19 wherein the symmetrical acetylenic ditertiary di-alcohol is dimethyl hexyne diol.

24. The method of preparing a polymeric emulsion interpolymer of the oil-in-water class from a plurality of ethylenically unsaturated monomers including a major proportion of vinyl acetate which comprises dispersing said monomers in an aqueous medium comprising from 1–10% by weight of said aqueous medium of a water soluble non-ionic protective colloid, the major proportion and essential component of which is selected from the group consisting of polyvinyl alcohol of at least 95% hydrolyzed quality, hydroxyl ethyl cellulose and mixtures thereof; a free radical polymerization catalyst; a free radical catalyst promoter, a quantity but not more than about 10% by weight of said aqueous medium of a water soluble non-ionic emulsifying agent containing a plurality of oxyethylene groups characterized by a HN value of an excess of 65 but not greater than 75 and a quantity but not more than about 1% by weight of said aqueous medium of a symmetrical, acetylenic, ditertiary di-alcohol containing from 6–10 carbon atoms and heating said system at an elevated temperature from about 140° F. to about 195° F. until monomer reflux substantially ceases.

25. The process of claim 24 wherein the ditertiary di-alcohol is dimethyl octyne diol.

26. The process of claim 24 wherein the ditertiary di-alcohol is dimethyl hexene diol.

References Cited in the file of this patent
UNITED STATES PATENTS

| | | |
|---|---|---|
| 2,106,180 | Kreimier | Jan. 25, 1938 |
| 2,304,917 | Hopff et al. | Dec. 15, 1942 |
| 2,473,929 | Wilson | June 21, 1949 |

OTHER REFERENCES

Carbide and Carbon Chemicals Co., "Tergitol" Dispersant NPX F–8156, 30 East 42nd Street, New York, N.Y., April 1953, pages 1–6.

Carbide and Carbon Chemicals Co., "Tergitol" F–8136A, 30 East 42nd Street, New York, N.Y., 4 pages.

UNITED STATES PATENT OFFICE

CERTIFICATE OF CORRECTION

Patent No. 2,892,802                                June 30, 1959

Eugene Paul Budewitz

It is hereby certified that error appears in the printed specification of the above numbered patent requiring correction and that the said Letters Patent should read as corrected below.

Column 14, lines 2 and 3, claim 16, strike out "is dimethyl octyne diol" and insert instead -- containing from 6-10 carbon atoms --.

Signed and sealed this 30th day of August 1960.

(SEAL)
Attest:

ERNEST W. SWIDER                              ROBERT C. WATSON

Attesting Officer                                 Commissioner of Patents